(12) United States Patent
Gerber et al.

(10) Patent No.: US 9,976,614 B2
(45) Date of Patent: May 22, 2018

(54) BALL NUT ASSEMBLY FOR AN ELECTROMECHANICALLY ACTUABLE PARKING BRAKE ASSEMBLY OF A BRAKE ASSEMBLY

(71) Applicant: Kelsey-Hayes Company, Livonia, MI (US)

(72) Inventors: Kraig E. Gerber, Livonia, MI (US); Manuel Barbosa, Livonia, MI (US); Changming Wu, Livonia, MI (US)

(73) Assignee: Kelsey-Hayes Company, Livonia, MI (US)

( * ) Notice: Subject to any disclaimer, the term of this patent is extended or adjusted under 35 U.S.C. 154(b) by 33 days.

(21) Appl. No.: 15/039,495

(22) PCT Filed: Nov. 26, 2014

(86) PCT No.: PCT/US2014/067602
§ 371 (c)(1),
(2) Date: May 26, 2016

(87) PCT Pub. No.: WO2015/081191
PCT Pub. Date: Jun. 4, 2015

(65) Prior Publication Data
US 2017/0023080 A1    Jan. 26, 2017

Related U.S. Application Data

(60) Provisional application No. 61/909,472, filed on Nov. 27, 2013.

(51) Int. Cl.
*F16D 55/08* (2006.01)
*F16D 65/18* (2006.01)
(Continued)

(52) U.S. Cl.
CPC .............. *F16D 65/18* (2013.01); *B60T 7/107* (2013.01); *F16D 51/20* (2013.01); *F16D 55/224* (2013.01);
(Continued)

(58) Field of Classification Search
CPC ...... F16D 65/18; F16D 65/22; F16D 2125/36; F16D 51/20; F16D 55/224;
(Continued)

(56) References Cited

U.S. PATENT DOCUMENTS 4,374,551 A * 2/1983 Birkenbach ............. F16D 65/18
188/71.9
4,809,824 A * 3/1989 Fargier ...................... B60T 8/32
188/106 P
(Continued)

FOREIGN PATENT DOCUMENTS

JP    2009014188 A    1/2009
JP    2012039765 A    2/2012

OTHER PUBLICATIONS

PCT International Search Report, Application No. PCT/US2014/067602, dated Mar. 10, 2015.

*Primary Examiner* — Pamela Rodriguez
(74) *Attorney, Agent, or Firm* — MacMillan, Sobanski & Todd, LLC

(57) ABSTRACT

A brake assembly includes a service brake assembly and an electromechanically actuable parking brake assembly. The electromechanically actuable parking brake assembly has a ball nut assembly comprising a ball screw and a ball nut. The ball screw and ball nut form a raceway for bearing members. The bearing members circulate within an internal path formed in the ball screw.

20 Claims, 14 Drawing Sheets

(51) Int. Cl.
  *B60T 7/10* (2006.01)
  *F16D 51/20* (2006.01)
  *F16D 55/224* (2006.01)
  *F16D 65/22* (2006.01)
  *F16H 25/22* (2006.01)
  *F16D 121/14* (2012.01)
  *F16D 121/24* (2012.01)
  *F16D 125/36* (2012.01)
  *F16D 125/48* (2012.01)

(52) U.S. Cl.
  CPC ......... *F16D 65/22* (2013.01); *F16H 25/2228* (2013.01); *F16D 2121/14* (2013.01); *F16D 2121/24* (2013.01); *F16D 2125/36* (2013.01); *F16D 2125/48* (2013.01)

(58) Field of Classification Search
  CPC ............. F16D 2121/14; F16D 2121/24; F16D 2125/48; F16H 25/2228; B60T 7/107
  USPC .... 188/72.8, 72.7, 72.1, 73.1, 156–158, 162
  See application file for complete search history.

(56) References Cited

U.S. PATENT DOCUMENTS

| | | | |
|---|---|---|---|
| 5,005,436 A | 4/1991 | Brusasco | |
| 6,397,981 B1 | 6/2002 | Tamasho | |
| 6,607,059 B1* | 8/2003 | Kapaan | F16D 65/18 188/72.8 |
| 6,767,305 B2* | 7/2004 | Backes | F16D 65/18 188/161 |
| 6,814,190 B1* | 11/2004 | Olschewski | B60T 13/741 188/162 |
| 8,011,482 B2* | 9/2011 | Boyle | B60T 13/746 188/156 |
| 2009/0283371 A1 | 11/2009 | Winkler et al. | |
| 2011/0162935 A1 | 7/2011 | Winkler et al. | |
| 2012/0018262 A1 | 1/2012 | Winkler | |

* cited by examiner

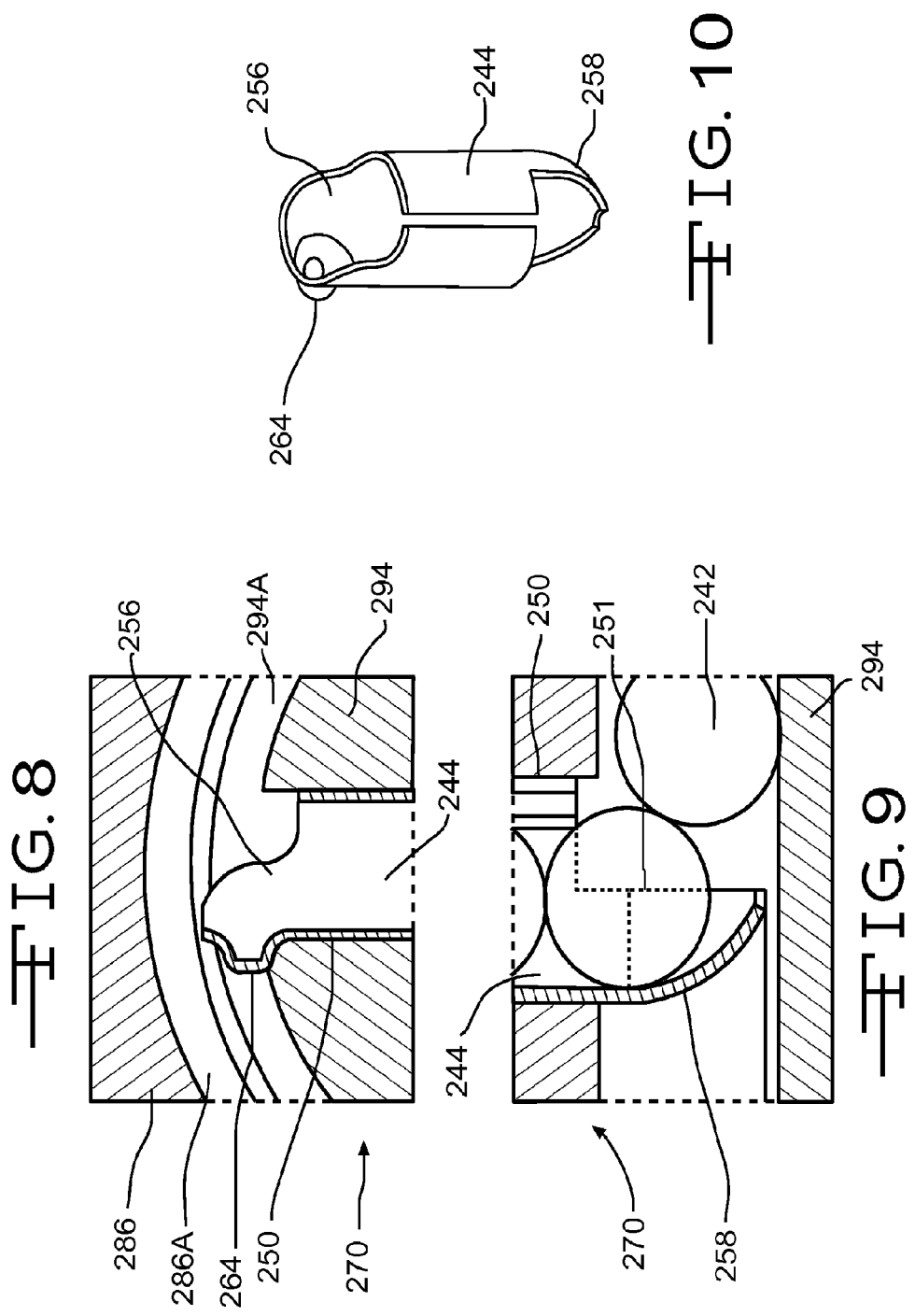

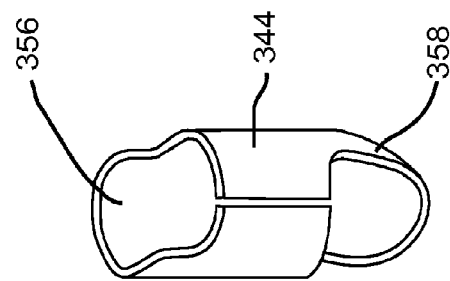
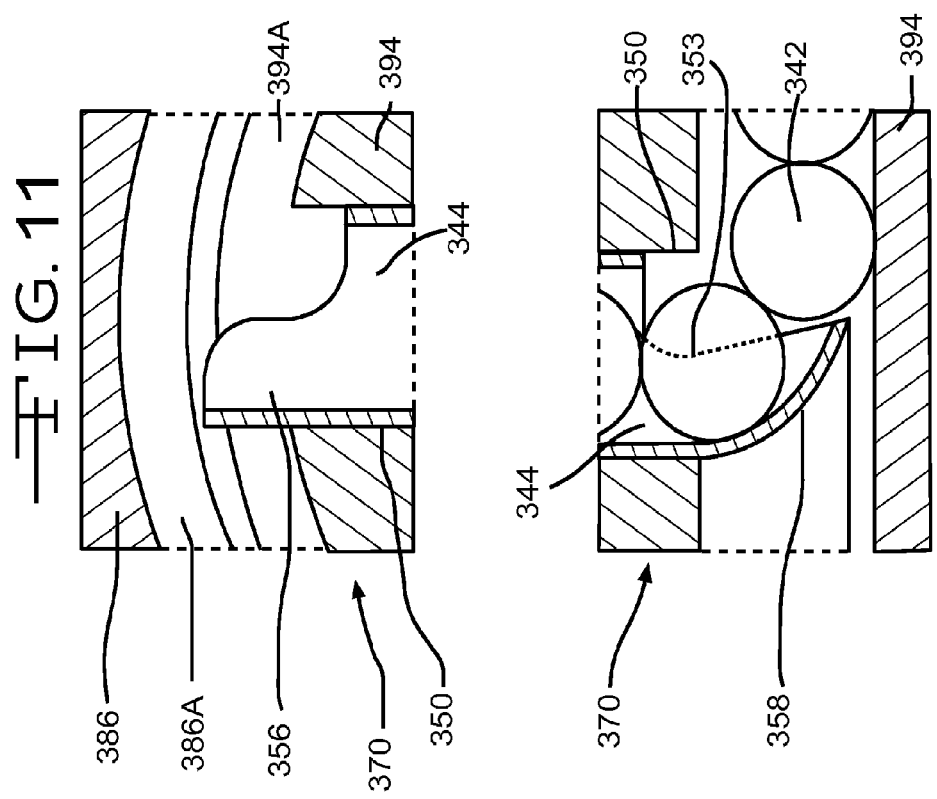

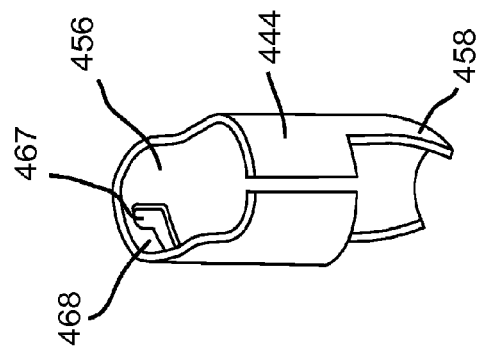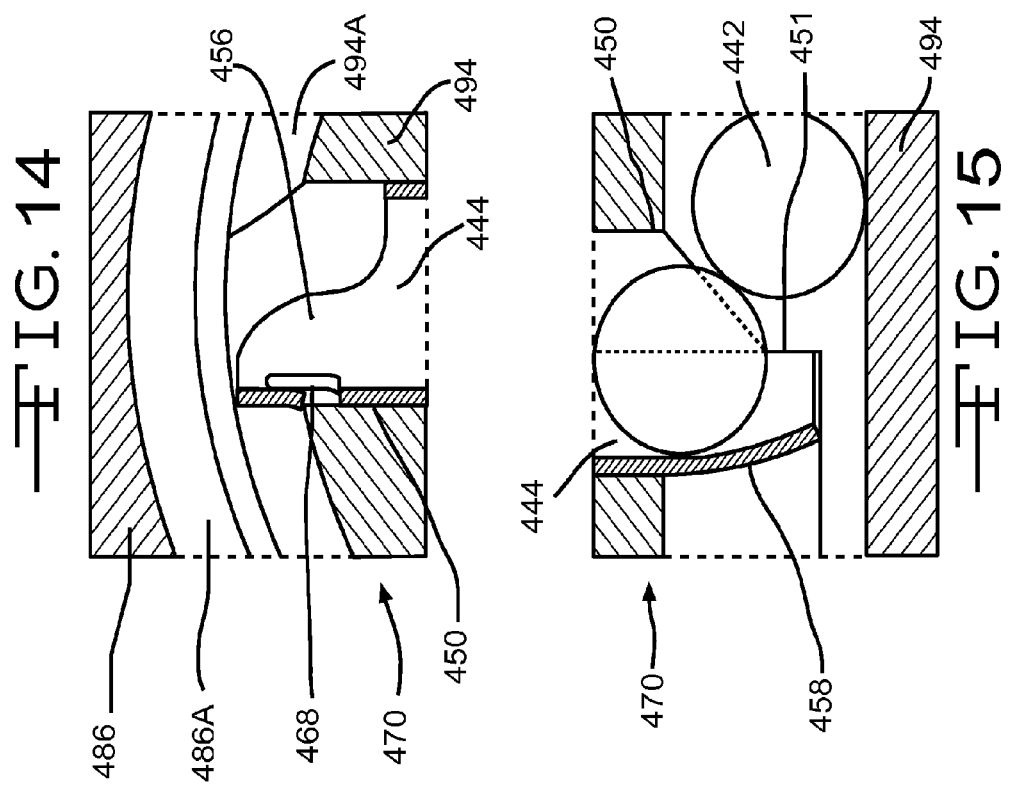

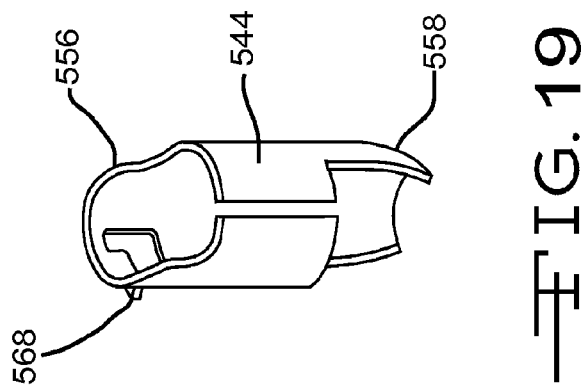
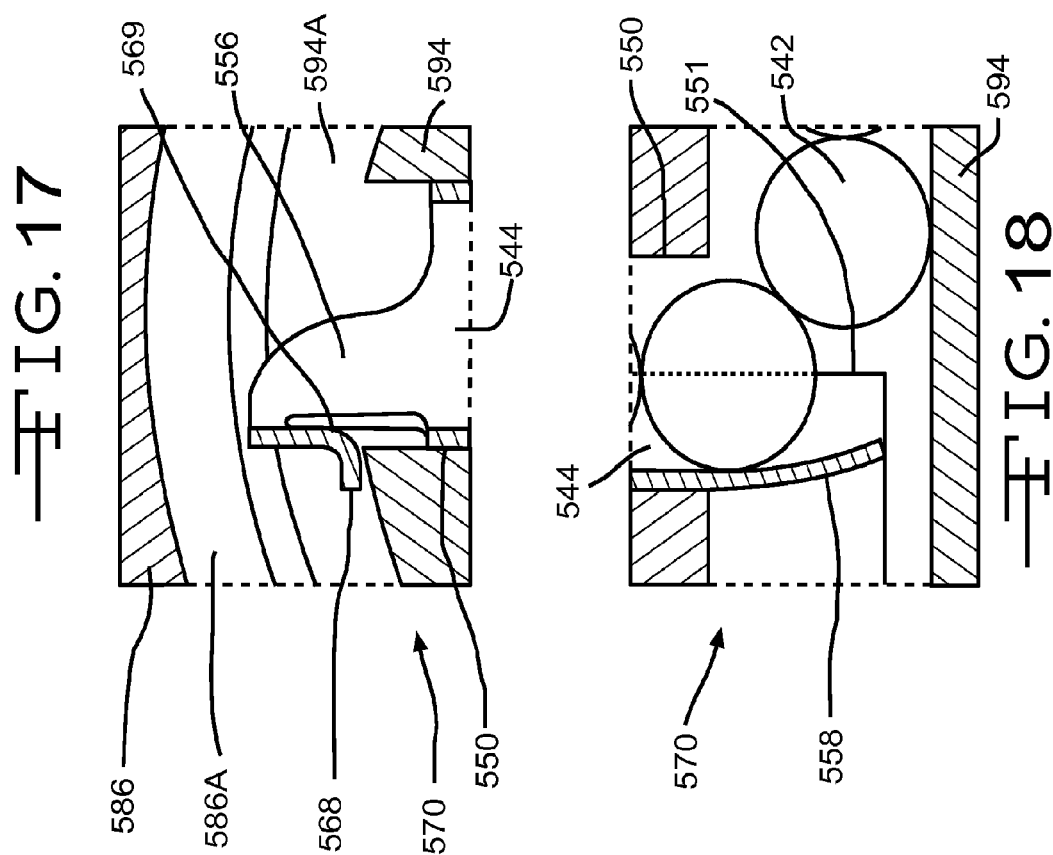

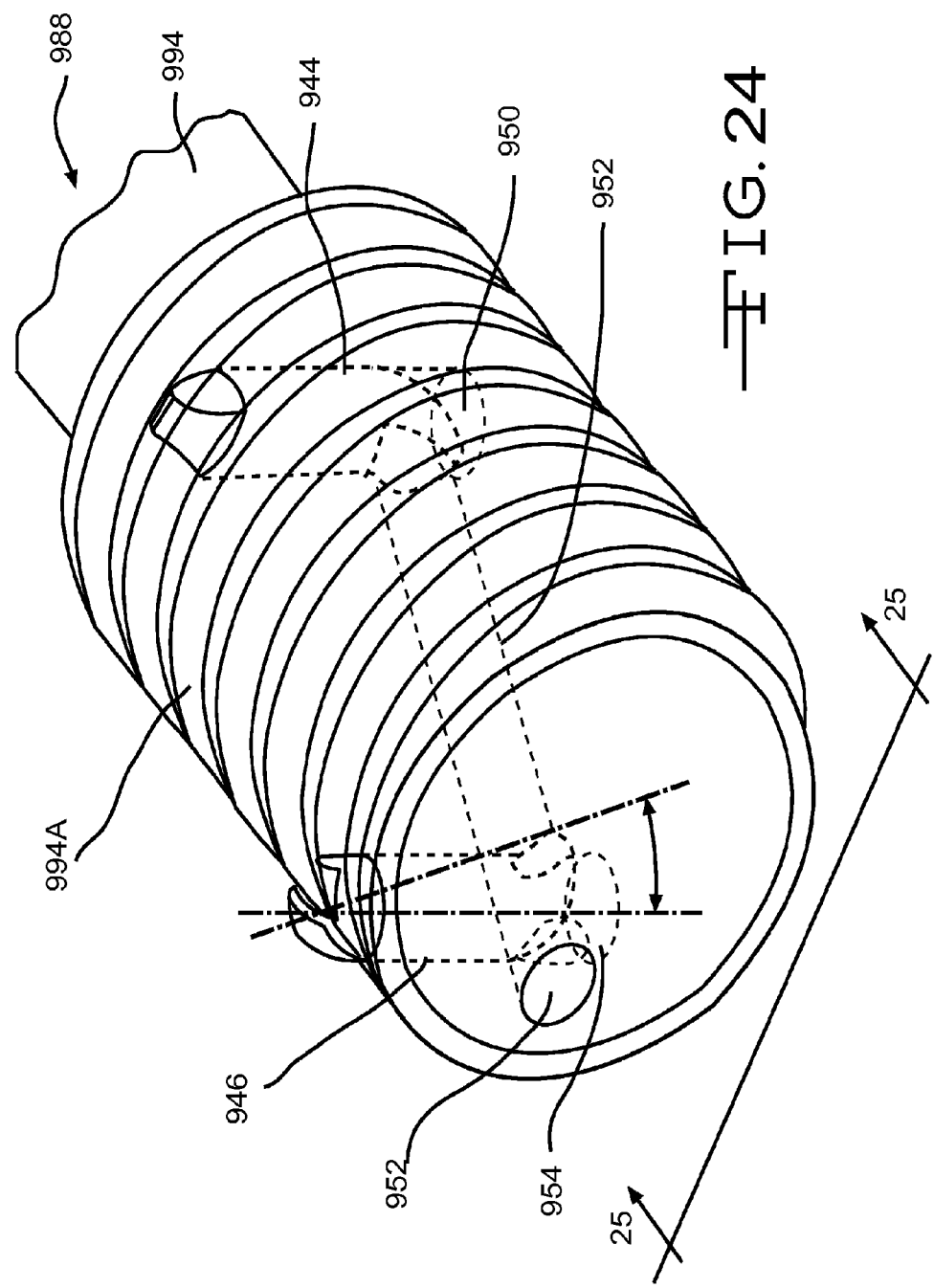

BALL NUT ASSEMBLY FOR AN ELECTROMECHANICALLY ACTUABLE PARKING BRAKE ASSEMBLY OF A BRAKE ASSEMBLY

RELATED APPLICATION

This patent application claims priority to and all of the benefits of U.S. Provisional Patent Application Ser. No. 61/909,472 which was filed on Nov. 27, 2013 and is entitled "Ball Nut Assembly for an Electromechanically Actuable Parking Brake Assembly of a Disc Brake Assembly."

BACKGROUND OF THE INVENTION

This invention relates in general to vehicle brake assemblies and in particular to an improved structure for a ball nut assembly for an electromechanically actuable parking brake assembly of a brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal.

The structures of these drum brake assemblies and disc brake assemblies, as well as the actuators therefor, are well known in the art. For example, the disc brake assembly may be a "drum-in-hat" type of disc brake assembly having an emergency or parking brake actuated by an electric actuator unit, such as disclosed by U.S. Pat. No. 8,011,482 to Boyle et al., the disclosure of which is hereby incorporated by reference in entirety herein. Alternatively, the disc brake assembly may have an electric emergency or parking brake actuated by an electric actuator unit, such as disclosed by U.S. Pat. No. 6,767,305 to Backes et al. or U.S. Pat. No. 8,684,147 to Winkler et al., the disclosures of which are hereby incorporated by reference in entirety herein.

Typically, the electric actuator unit employs a ball nut assembly for use in actuating the emergency or parking brake. However, available packaging space for the ball nut assembly is limited in order to maximize vehicle occupant space. Thus, it would be desirable to reduce packaging space required for the ball nut assembly of the electric actuator unit for the electromechanically actuable parking brake assembly of a disc brake assembly.

SUMMARY OF THE INVENTION

This invention relates to an improved structure for a ball nut assembly for an electromechanically actuable parking brake assembly of a brake assembly, either a disc brake assembly having an electric parking brake or a drum-in-hat parking brake assembly having an electric parking brake.

According to one embodiment, a brake assembly may comprise, individually and/or in combination, one or more of the following features: a service brake assembly and an electromechanically actuable parking brake assembly. The electromechanically actuable parking brake assembly has a ball nut assembly comprising a ball screw and a ball nut. The ball screw and ball nut form a raceway for bearing members. The bearing members circulate within an internal path formed in the ball screw. The parking brake assembly is part of the service brake assembly.

According to another embodiment, a ball nut assembly for an electromechanically actuable parking brake assembly may comprise, individually and/or in combination, one or more of the following features: a ball nut and a ball screw. The ball nut has an internal thread and the ball screw has an external thread. The internal and external threads form a raceway. The ball screw has first, second, and third openings. The first and third openings are from an outer surface of the ball screw. The second opening is internal to the ball screw and connects the first and third openings.

According to another embodiment, a ball nut assembly for an electromechanically actuable parking brake assembly may comprise, individually and/or in combination, one or more of the following features: a ball nut, a ball screw, and first and second inserts. The ball nut has an internal thread and the ball screw has an external thread. The internal and external threads form a raceway for bearing members that support the ball nut on the ball screw. The ball screw has a first opening from the raceway, a second opening through the ball screw, and a third opening from the raceway. The second opening connects the first and third openings. The bearing members circulate through the raceway, first opening, second opening, and third opening. The first insert is in the first opening and has top and bottom flanges. The second insert is in the third opening and has top and bottom flanges.

An advantage of an embodiment is reduced packaging space required for the ball nut assembly of the electric actuator unit for the electromechanically actuable parking brake assembly of a disc brake assembly. Other advantages of this invention will become apparent to those skilled in the art from the following detailed description of the preferred embodiments, when read in light of the accompanying drawings.

BRIEF DESCRIPTION OF THE DRAWINGS

FIG. 8 is a partial sectional view of a second embodiment of a ball nut assembly in accordance with the present invention.

FIG. 9 is a second partial sectional view of the second embodiment of the ball nut assembly illustrated in FIG. 8.

FIG. 10 is a perspective view of an insert used in the second embodiment of the ball nut assembly illustrated in FIGS. 8 and 9.

FIG. 11 is a partial sectional view of a third embodiment of a ball nut assembly in accordance with the present invention.

FIG. 12 is a second partial sectional view of the third embodiment of the ball nut assembly illustrated in FIG. 11.

FIG. 13 is a perspective view of an insert used in the third embodiment of the ball nut assembly illustrated in FIGS. 11 and 12.

FIG. 14 is a partial sectional view of a fourth embodiment of a ball nut assembly in accordance with the present invention.

FIG. 15 is a second partial sectional view of the fourth embodiment of the ball nut assembly illustrated in FIG. 14.

FIG. 16 is a perspective view of an insert used in the fourth embodiment of the ball nut assembly illustrated in FIGS. 14 and 15.

FIG. 17 is a partial sectional view of a fifth embodiment of a ball nut assembly in accordance with the present invention.

FIG. 18 is a second partial sectional view of the fifth embodiment of the ball nut assembly illustrated in FIG. 17.

FIG. 19 is a perspective view of an insert used in the fifth embodiment of the ball nut assembly illustrated in FIGS. 17 and 18.

FIG. 24 is a perspective view of an eighth embodiment of a ball nut assembly in accordance with the present invention.

DETAILED DESCRIPTION OF THE PREFERRED EMBODIMENTS

Figure 1:
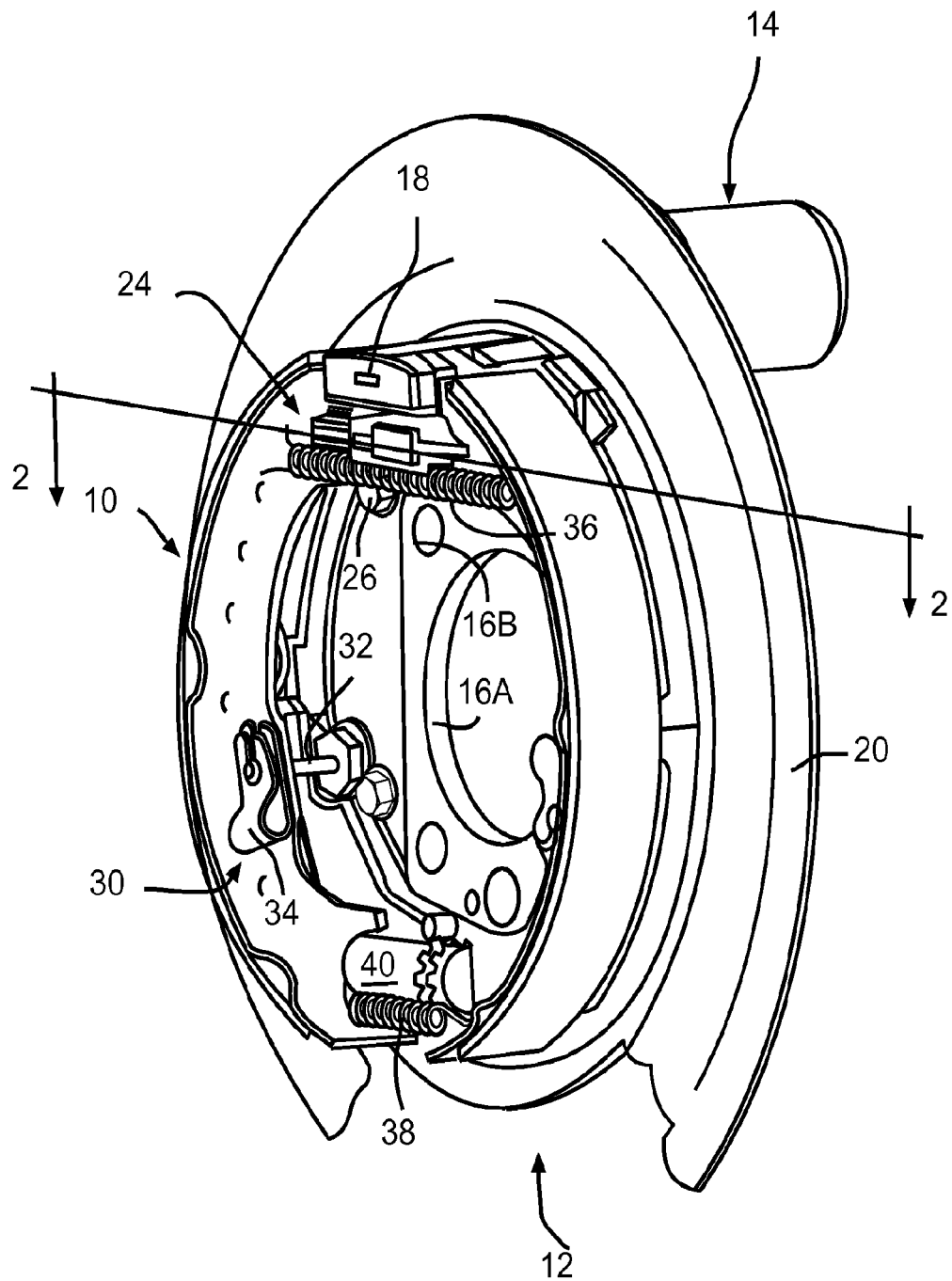
FIG. 1 is a view of a portion of a prior art vehicle drum-in-hat disc brake assembly.
Figure 2:
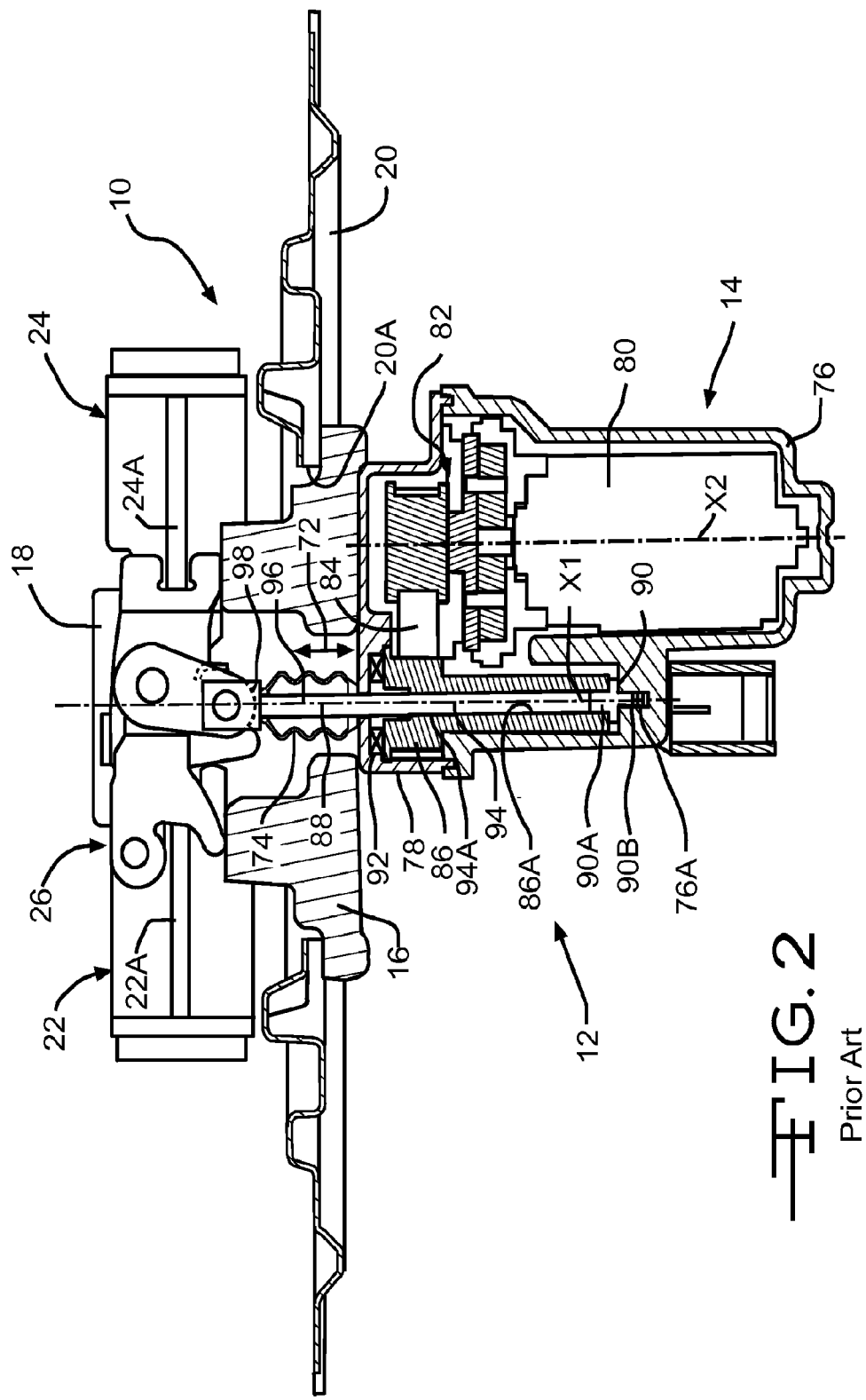
FIG. 2 is a sectional view taken along line 2-2 of FIG. 1.

Referring now to FIGS. 1 and 2, there is illustrated a prior art drum-in-hat parking and emergency brake 10 of a vehicle drum-in-hat disc brake assembly, indicated generally at 12, having an electric actuator unit 14, indicated generally at 14, for actuating the drum-in-hat parking and emergency brake 10 (i.e., the park brake), thereof. The general structure and operation of the brake assembly 12 is conventional in the art and may be generally similar to the type illustrated and described in connection with U.S. Pat. No. 5,322,145 to Evans, U.S. Pat. No. 6,729,444 to Schmandt et al., and U.S. Pat. No. 8,011,482 to Boyle et al., the disclosures of which are hereby incorporated by reference in entirety herein. Although this invention will be described and illustrated in connection with the particular brake assembly 12 disclosed herein, it will be appreciated that this invention may be used in connection with other drum-in-hat disc brake assemblies in connection with the associated parking and emergency brake portion and in connection with drum brake assemblies in connection with the associated service brake portion if so desired. Also, only those portions of the brake assembly 12 which are necessary for a full understanding of this invention will be explained and illustrated in detail.

The brake assembly 12 includes an adapter or mounting flange 16, an abutment 18, a backing plate 20, first and second brake shoes 22 and 24, respectively, and a park brake shoe actuation link assembly, indicated generally at 26. As illustrated, the adapter 16 is a one-piece casting and is adapted to be secured to a fixed, non-rotatable component of the vehicle, such as an axle flange (not shown) or a steering knuckle (not shown) for enclosing a rotatable axle (not shown). The adapter 16 includes a relatively large opening 16A and a plurality of smaller lug bolt mounting holes 16B formed therein about the opening 16A. The opening 16A permits an outer end of an axle to extend therethrough to the vehicle wheel (not shown), and suitable fasteners (not shown), are disposed in the lug bolt mounting holes 16B to secure the adapter 16 to the associated vehicle component. Also, in this embodiment, the abutment 18 is integrally cast with the adapter 16. Alternatively, the construction or make-up of the adapter 16 and/or the abutment 18 may be other than illustrated and described if so desired.

The backing plate 20 of the brake assembly 12 is preferably a stamped metal backing plate and includes a relatively large central opening 20A and a plurality of smaller openings (not shown) formed therein about the central opening 18A of the adapter 18. The central opening 20A of the backing plate 20 permits an outer end of the rotatable axle (not shown) to extend therethrough to a wheel (not shown) of the vehicle. The smaller openings of the backing plate 20 are adapted to receive suitable fasteners to secure the backing plate 20 to the adapter 16. Alternatively, the construction or make-up of the backing plate 20 and/or the adapter 16 may be other than illustrated and described if so desired and the securing to one another and/or to other associated vehicle components may be other than illustrated and described if so desired.

The first and second brake shoes 22 and 24, respectively, are supported by conventional pivot pin and spring-clip assemblies, indicated generally at 30. Each of the assemblies 30 includes a pin 32 which extends through an opening (not shown) of the backing plate 20 and through an associated opening (not shown) provided in the first and second brake shoes 22 and 24, respectively. The pins 32 have outer ends which are adapted to be fastened or secured to clips 34 of the spring-clip assemblies 30 to thereby secure the first and second brake shoes 22 and 24, respectively, to the backing plate 20 in a conventional manner. The brake assembly 12 also includes first and second retraction springs 36 and 38, respectively, and a manual brake shoe adjusting mechanism 40. Alternatively, supporting of the brake shoes 22 and 24, respectively, on the backing plate 20 may be other than illustrated if so desired.

The link assembly 26 is adapted to receive a first web portion 22A of the first brake shoe 22 and a second web portion 24A of the second brake shoe 24.

As best shown in FIG. 2, the electric actuator unit 12 for actuating the drum-in-hat parking and emergency brake 10 includes an electric motor 80, a planetary gear-set 82, a belt drive 84, a spindle nut 86, and a pull rod 88. The electric motor 80 is operatively connected to a suitable actuation member (not shown), for actuating the drum-in-hat parking and emergency brake 10. The electric motor 80 may be any suitable type of motor, such as for example a direct current motor.

The planetary gear-set 82 is operatively connected to an output of the electric motor 80 and is effective to increase or multiply the torque output from the motor 80. The belt drive 84 is effective to operatively couple together the planetary gear-set 82 and the spindle nut 86. As shown in FIG. 2, the spindle nut 86 and pull rod 88 define a first axis X1 and the motor 80 defines a second axis X2 which is parallel to and offset relative to the first axis X1 to provide a "double-lobe" actuator unit design. Alternatively, the actuator unit design may be other than a "double-lobe."

The spindle nut 86 fixed axially within the unit 12 by suitable means, such as for example by a member 90, but also free to move rotationally therein via the belt drive 84. To accomplish this, the member 90 includes a first end 90A which is preferably press-fit into an opened end of the spindle nut 86 and a second end 90B which is slip fit into an opening 76A provided in a first housing part 76 of the unit 12. Also, a suitable bearing 92, such as an angular contact bearing, is disposed in a second housing part 78 of the unit 12 for supporting the spindle nut 86 for rotation. The spindle nut 86 is provided with "internal" threads 86A along an inner portion thereof. Alternatively, the spindle nut 86 may be supported for rotation by other suitable means if so desired.

The pull rod 88 includes a first end section 94 provided with "external" threads 94A along a portion thereof, and an opposite second end section 96 having a yoke or clevis-like end member 98 connected thereto by suitable means. The "external" threads 94A of the pull rod 88 mesh or threadably engage with the "internal" threads 86A of the spindle nut 86 so that rotational movement of the spindle nut 86 causes translatory or axial movement of the pull rod 88 (as indicated by arrow 72 in FIG. 2) in a direction generally perpendicular to the backing plate 18 (i.e., in and out of the brake assembly 12 in FIG. 2). Also, in the illustrated embodiment, a boot seal 74 is preferably disposed on the external or "exposed" portion of the pull rod 88 (i.e., the portion of the pull rod 88 which extends from the housing of the electric actuator unit 14).

The yoke 98 may be connected to the end 94 of the pull rod 88 by any suitable method, such as for example, welding, press-fit, threading or any other suitable connecting method. Preferably, the method used to connect the yoke 98 to the end 94 of the pull rod 88 permits free rotational movement between the yoke 98 and the link assembly 26. Alternatively, the yoke 98 may be connected to the end 94 of the pull rod 88 by other means if so desired.

During operation, when the link assembly 26 is actuated (i.e., moved downwardly in the direction of arrow 72 in FIG. 2 via actuation of the electric unit 14), the link assembly 26 is effective to engage and operatively move the first and second brake shoes 22 and 24, respectively, outwardly into engagement with an inner cylindrical braking surface (not shown) of a drum portion of a drum-in-hat brake rotor.

Figure 3:
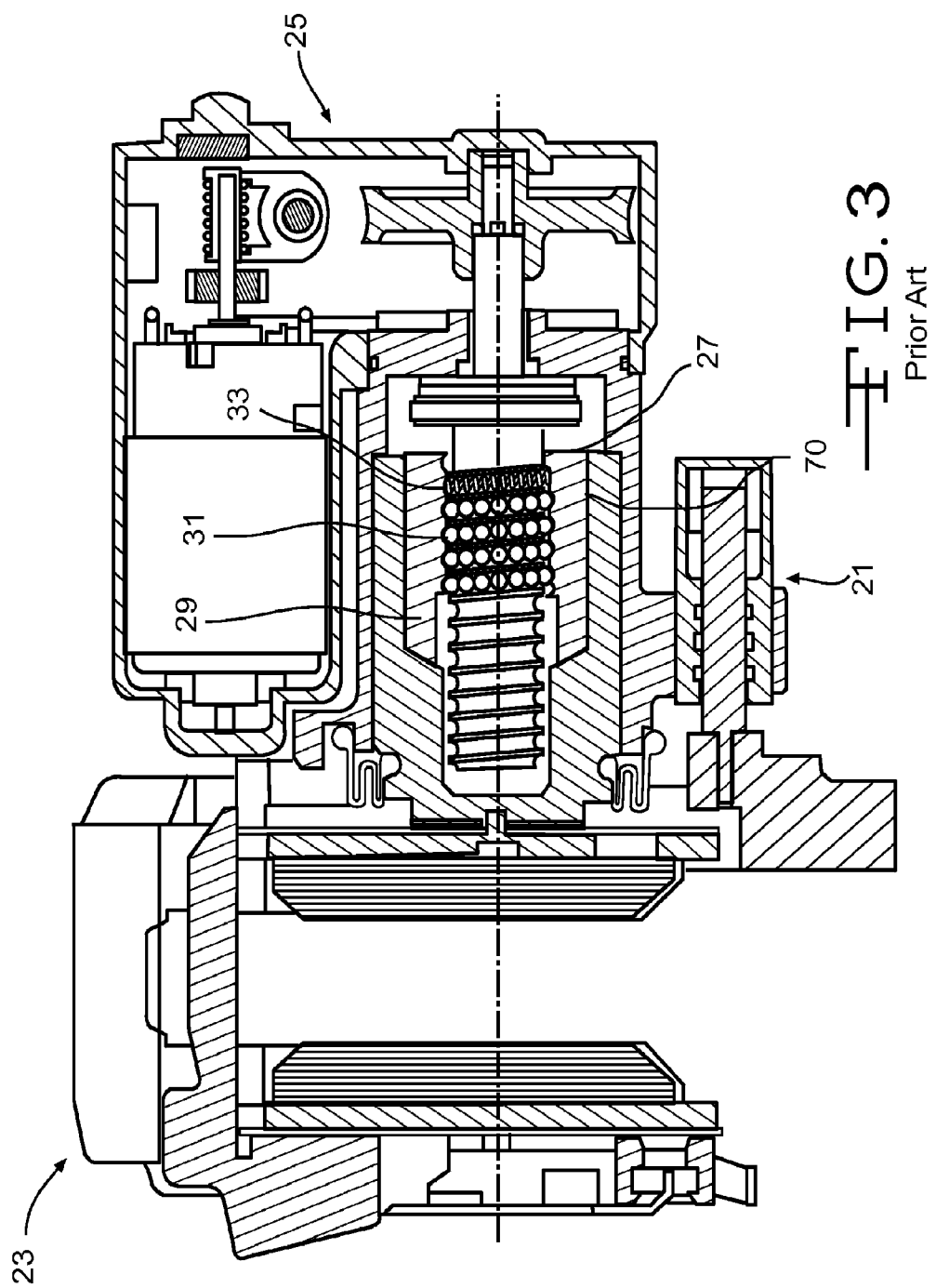
FIG. 3 is a partial sectional view of a portion of a prior art disc brake assembly.
Figure 4:
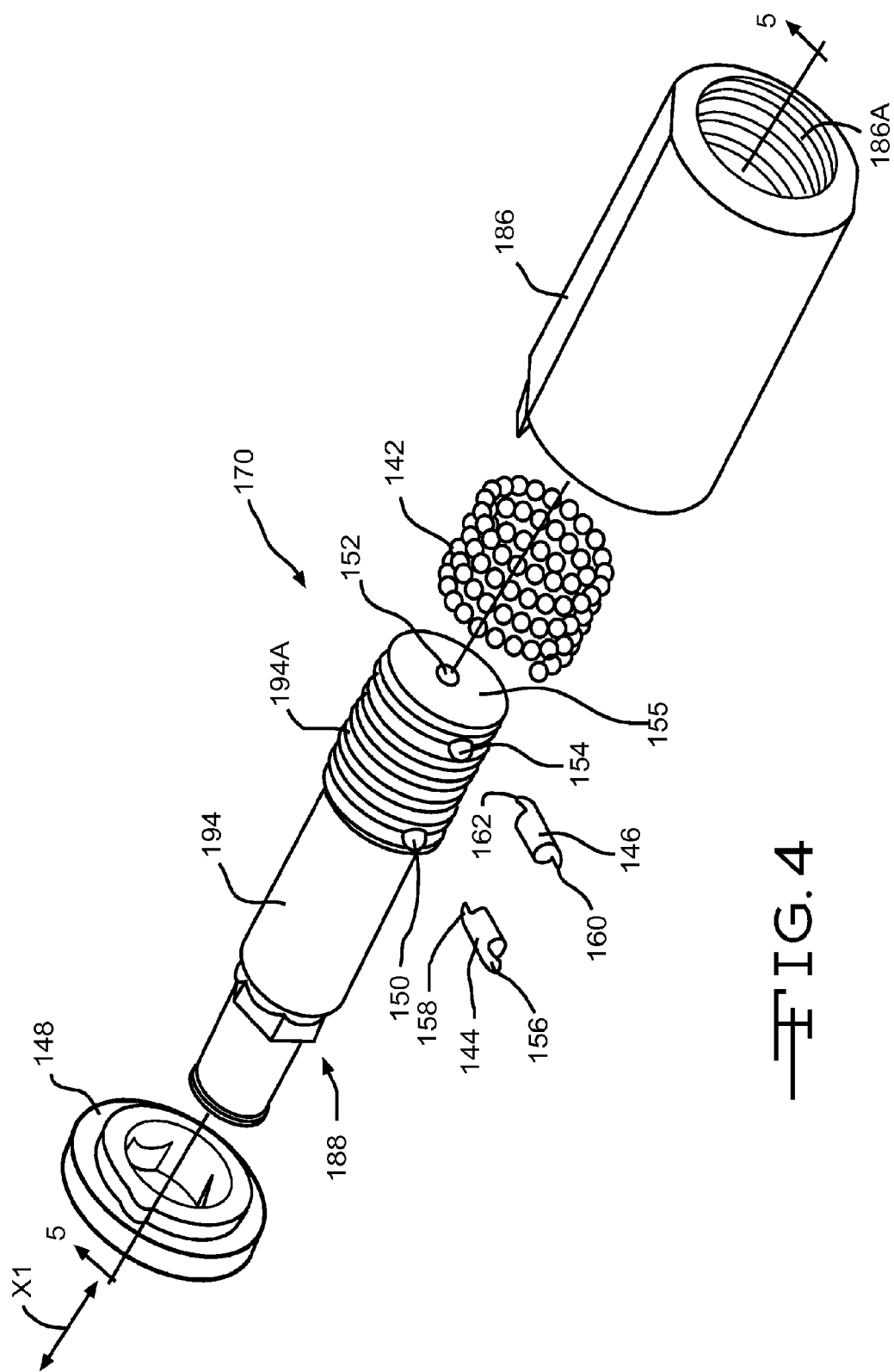
FIG. 4 is an exploded perspective view of a first embodiment of a ball nut assembly in accordance with the present invention.

Referring now to FIG. 3, there is illustrated a portion of a prior art disc parking and emergency brake, indicated generally at 21, of a vehicle disc brake assembly, indicated generally at 23, having an electric actuator unit, indicated generally at 25, for actuating the parking and emergency brake 21 (i.e., the park brake), thereof. The vehicle disc brake assembly 23 may be such as is disclosed by U.S. Pat. No. 8,684,147 to Winkler et al. The electric actuator unit 25 includes a ball nut assembly 70, including a fixed threaded spindle 27 and an axially movable threaded nut 29 via ball bearings 31. As shown in FIG. 3, the ball nut assembly 70 is a non-recirculation type wherein the ball bearings 31 are restrained between a first spring 33 and a second spring (not shown). Alternatively, the ball nut assembly 70 may be a recirculating type wherein the ball bearings 31 are recirculated through an external ball bearing return, such as disclosed by U.S. Pat. No. 6,767,305 to Backes et al., the disclosure of which is hereby incorporated by reference in entirety herein Referring now to FIGS. 4-7, there is illustrated an embodiment of a ball nut assembly, indicated generally at 170, produced in accordance with the present invention and configured for use with a parking and emergency brake of a vehicle brake assembly having an electric actuator unit for actuating the parking and emergency brake, thereof. The general structure and operation of the parking and emergency brake of the vehicle brake assembly is conventional in the art. For example the vehicle brake assembly may be configured and/or modified for use in connection with the prior art vehicle drum-in-hat disc brake assembly 12 shown in FIGS. 1 and 2 or the prior art disc brake assembly 23 shown in FIG. 3. Thus, only those portions of the ball nut assembly 170, including the associated prior art vehicle brake assembly, which are necessary for a full understanding of this invention will be explained and illustrated in detail.

The ball nut assembly 170 includes a ball nut 186, ball bearing members 142, a ball screw indicated generally at 188 and having a first end section 194, first and second inserts 144 and 146, respectively, and a spacer 148. The ball screw 188 is axially fixed such that the ball screw 188 only rotates and does not move axially. The bearing members 142 support the ball nut 186 on the ball screw 188. As a result, the ball screw 188 only rotates when driven by an electric motor (not shown) and the rotation motion of the ball screw 188 causes the ball nut 186 to only move axially in either a forward direction or a reverse direction, along an axis X1, depending upon the direction of rotation of the ball screw 188. Alternatively, as one skilled in the art will recognize, the ball nut 186 may be axially fixed such that the ball nut 186 only rotates when driven by the electric motor, which in turn causes the ball screw 188 to only move axially in either the forward direction or the reverse direction.

The first end section 194 includes "external" threads 194A provided in an outer surface thereof and the ball nut 186 includes "internal" threads 186A provided in an inner surface thereof. Together, the "external" threads 194A and the "internal" threads 186A form a raceway. The bearing members 142 are received in the raceway and travel, or circulate, between the raceway and an internal path, or circuit, provided in the first end section 194. The internal path is formed by a first side opening 150 from the outer surface of the first end section 194, a second axial opening 152 from an end surface 155, and a third side opening 154 from the outer surface of the first end section 194.

Figure 5:
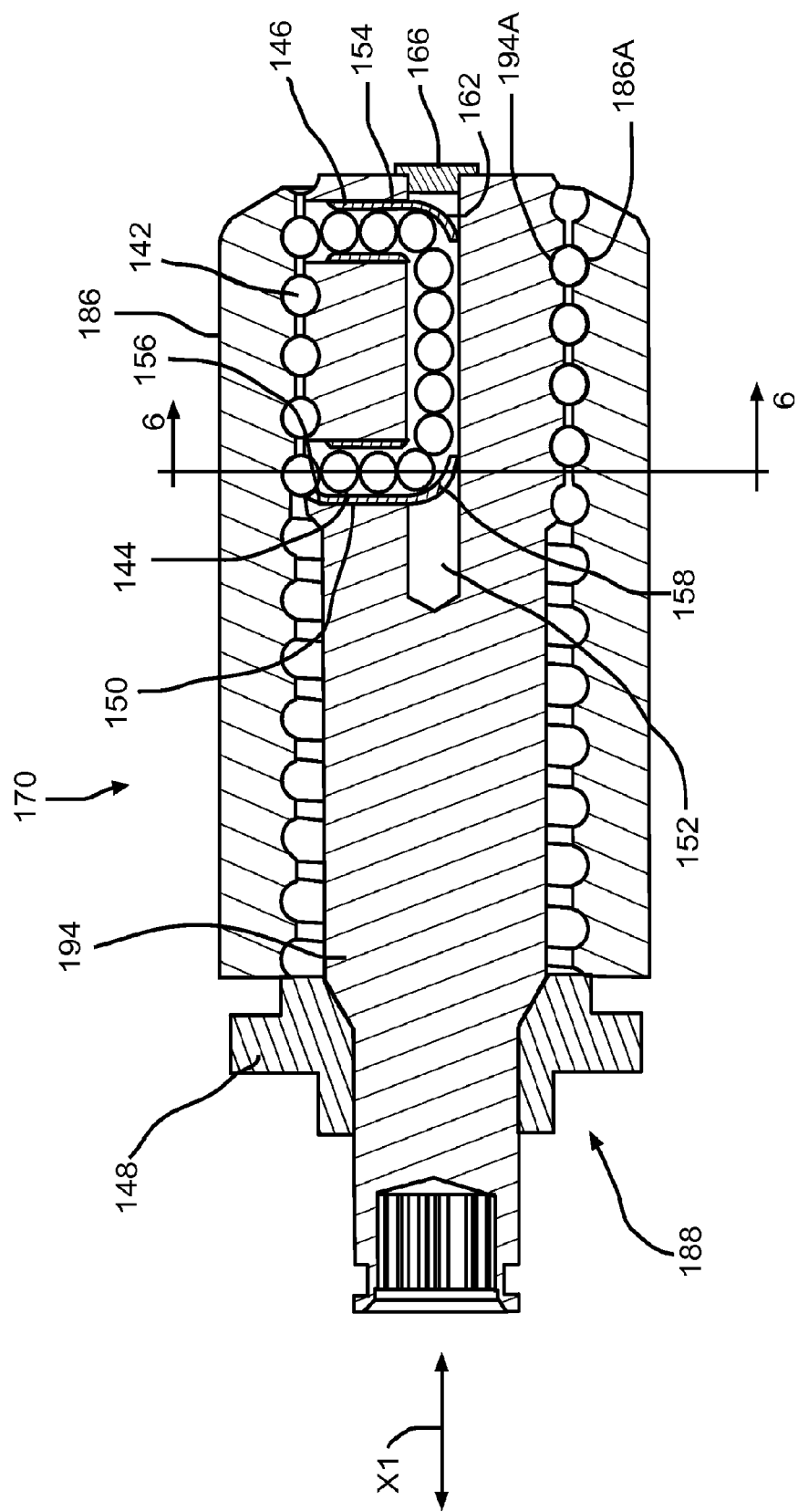
FIG. 5 is a sectional view taken along line 5-5 of FIG. 4.
Figure 6:
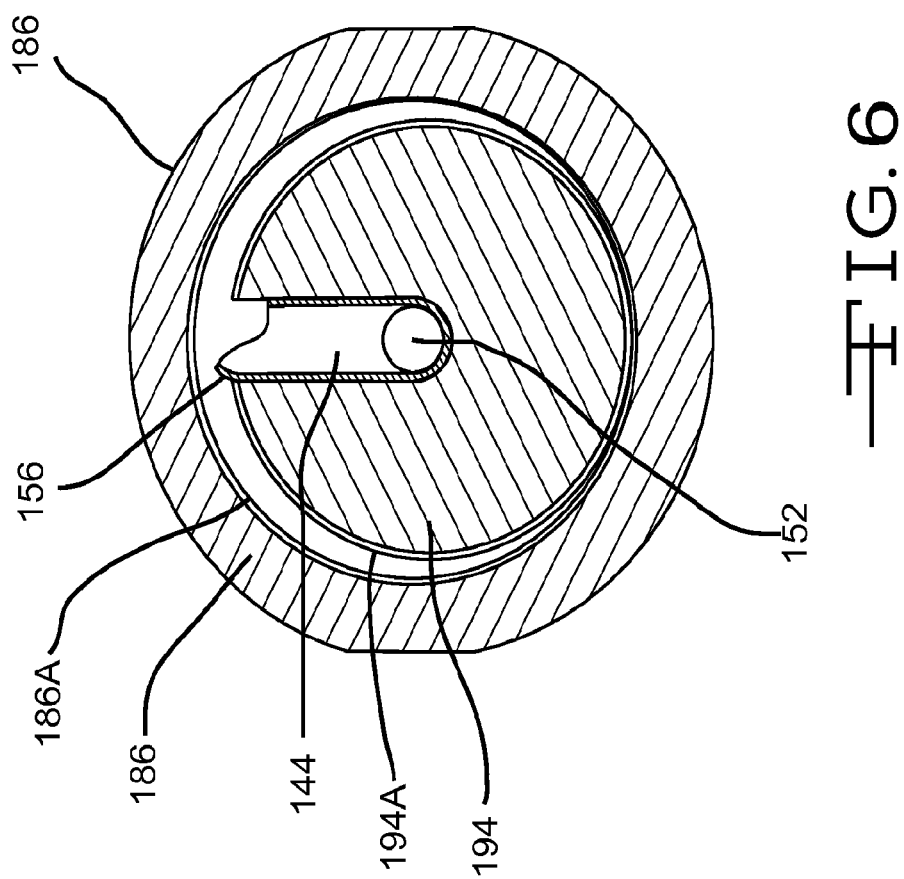
FIG. 6 is a sectional view taken along line 6-6 of FIG. 5.

As illustrated, the first opening 150 and the third opening 154 are generally radially extending openings and the second opening 152 is generally an axially extending opening relative to the axis X1 of the first end section 194. The second opening 152 may be formed in alignment with the axis X1 of the first end portion 194 or may be formed offset relative to the axis X1. As best shown in FIG. 5, the second opening 152 connects the first opening 150 and the third opening 154.

To assist in circulating the bearing members 142, the first and second inserts 144 and 146, respectively, are provided. The first insert 144 may have top and bottom flanges 156 and 158, respectively, and the second insert 146 may have top and bottom flanges 160 and 162, respectively. Alternatively, the first insert 144 may omit the bottom flange 158 and the second insert 146 may omit the bottom flange 162.

The first insert top flange 156 assists or improves circulation of the bearing members 142 between the raceway and the first opening 150. The first insert bottom flange 158 assists or improves circulation of the bearing members 142 between the first opening 150 and the second opening 152. The second insert bottom flange 162 assists or improves circulation of the bearing members 142 between the second opening 152 and the third opening 154. The second insert top flange 160 assists or improves circulation of the bearing members 142 between the third opening 154 and the raceway.

Figure 7:
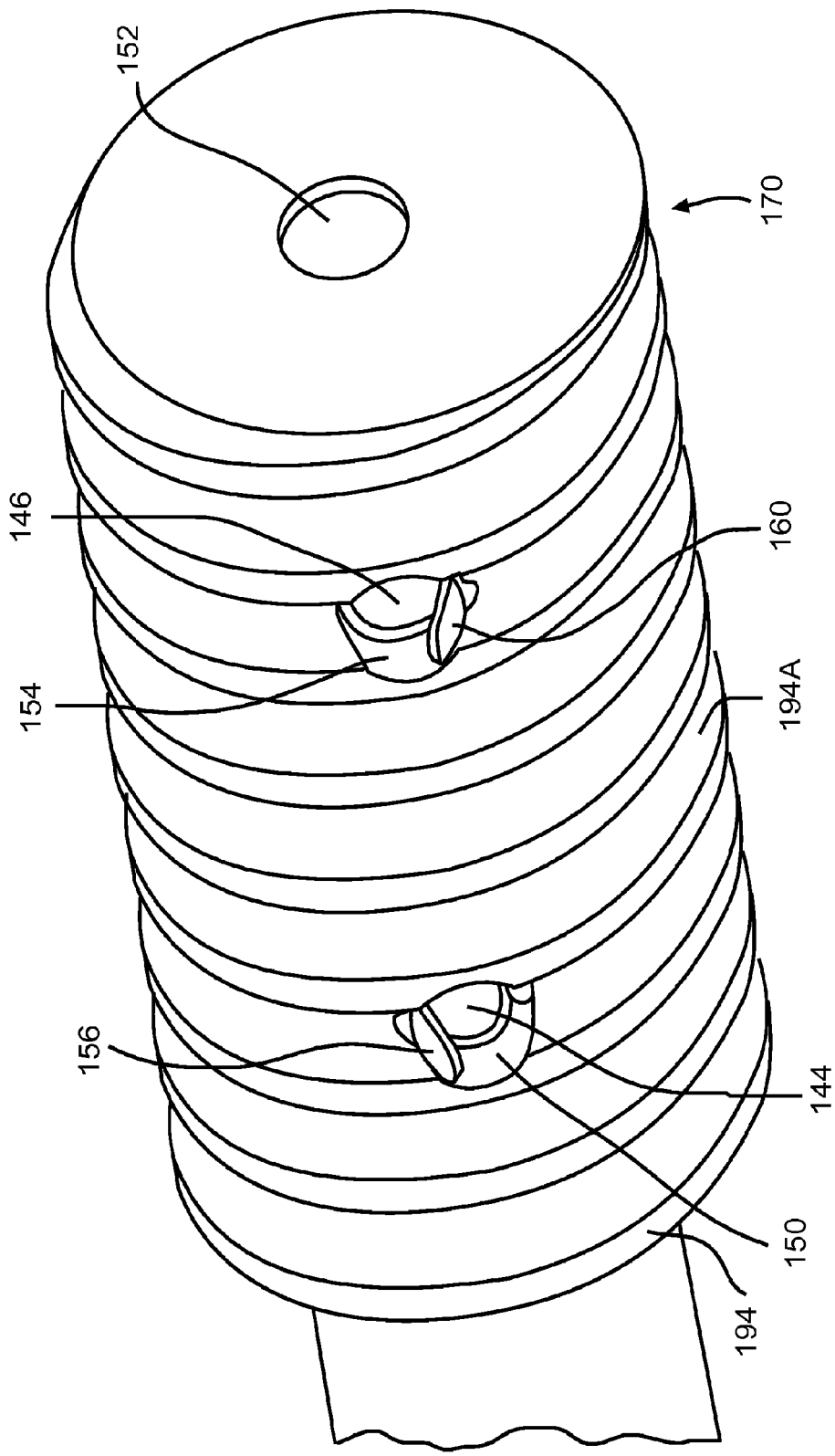
FIG. 7 is a perspective view of the first embodiment of a ball nut assembly illustrated in FIG. 4.

As best shown in FIG. 7, the first insert top flange 156 and the second insert top flange 160 are aligned transversely to the raceway such that the first insert top flange 156 and the second insert top flange 160 direct the bearing members 142 between the first opening 150 and the raceway and between the third opening 154 and the raceway. Similarly, as best shown in FIG. 5, the first insert bottom flange 158 and the second insert bottom flange 162 are aligned with the second axial opening 152 such that the first insert bottom flange 158 and the second insert bottom flange 162 direct the bearing members 142 between the first opening 150 and the second axial opening 152 and between the third opening 154 and the second axial opening 152.

For example, when the ball screw 188 is rotated in a clockwise direction about the X1 axis, the bearing members 142 are also rotated in the clockwise direction. Because the ball screw 188 is axially fixed, the bearing members 142 travel in the raceway towards the first opening 150. The first insert top flange 156 guides the bearing members 142 from the raceway and into the first opening 150. The first insert bottom flange 158 then guides the bearing members 142 into the second opening 152. The bearing members 142 travel through the second opening 152 from the first opening 150 to the third opening 154. The second insert bottom flange 162 then guides the bearing members 142 into the third opening 154 and the second insert top flange 160 guides the bearing members 142 back into the raceway. The path traveled by the bearing members 142 when the ball screw 188 is rotated clockwise about the X1 axis comprises a first internal path. When the ball screw 188 is rotated counterclockwise about the X1 axis, the bearing members 142 travel a second internal path, the second internal path being the first path in reverse.

The ball screw 188 may include a plug 166. The plug 166 may be used when the second insert 146 omits the bottom flange 162. When the second insert bottom flange 162 is omitted, the plug 166 retains the bearing members 142 in the second opening 152. Furthermore, when the second opening 152 stops at the first opening 150, the first insert bottom flange 158 may be omitted. When the first insert bottom flange 158 is omitted, an interface between the first and second openings 150 and 152, respectively, may guide the bearing members 142 into and out of the first opening 150.

The first and second inserts 144 and 146, respectively, may be produced from spring steel. Alternatively, the first and second inserts 144 and 146, respectively, may be produced from other suitable materials. For example, the first and second inserts 144 and 146, respectively, may be cast from plastic.

When the first and second inserts 144 and 146, respectively, are fabricated from spring steel, the first and second inserts 144 and 146, respectively, are produced having a slightly larger diameter than the first or third openings 150 or 154, respectively, in which the first or second inserts 144 or 146, respectively, is inserted. By having a slightly larger diameter than the first or third openings 150 or 154, respectively, the first and second inserts 144 and 146, respectively, will press fit into the first or third openings 150 or 154, respectively. Alternatively, the first and second inserts 144 and 146, respectively, may be secured in the first or third openings 150 or 154, respectively, using other suitable means known to those skilled in the art. For example, the first and second inserts 144 and 146, respectively, may be secured in the first and third openings 150 or 154 using welds, rivets, or adhesives.

The first opening 150, the second opening 152, and the third opening 154 may be drilled into the first end section 194. Alternatively, the first opening 150, the second opening 152, and the third opening 154 may be produced using a suitable means known to those skilled in the art. For example, the first end section 194 may be a casting with the first opening 150, the second opening 152, and the third opening 154 formed therein.

Referring now to FIGS. 8-10, there is illustrated a second embodiment of a ball nut assembly, indicated generally at 270, produced in accordance with the present invention and for use with a parking and emergency brake of a vehicle brake assembly having an electric actuator unit for actuating the parking and emergency brake, thereof. Because the ball nut assembly 270 is a variation of the ball nut assembly 170 of FIGS. 4-7, like reference numerals, increased by 100, designate corresponding parts in the drawings and detailed description thereof will be omitted.

The ball nut assembly 270 includes a first insert 244 having a top flange 256 and a bottom flange 258. While a second insert is not illustrated, the second insert is similar to the first insert 244.

As illustrated, the top flange 256 is a vertical extension of the first insert 244 that includes a dimple 264. The dimple 264 acts to align the first insert 244 to "external" threads 294A and "internal" threads 286A and/or as a stop to control insertion depth in the first opening 250. As illustrated, the bottom flange 258 has a rounded scoop shape and straight vertical edges 251.

Referring now to FIGS. 11-13, there is illustrated a third embodiment of a ball nut assembly, indicated generally at 370, produced in accordance with the present invention and for use with a parking and emergency brake of a vehicle brake assembly having an electric actuator unit for actuating the parking and emergency brake, thereof. Because the ball nut assembly 370 is a variation of the ball nut assembly 170 of FIGS. 4-7, like reference numerals, increased by 200, designate corresponding parts in the drawings and detailed description thereof will be omitted.

The ball nut assembly 370 includes a first insert 344 having a top flange 356 and a bottom flange 358. While a second insert is not illustrated, the second insert is similar to the first insert 344.

As illustrated, the top flange 356 is a smooth vertical extension of the first insert 344. As illustrated, the bottom flange 358 has a rounded scoop shape with inward angled edges 353.

Referring now to FIGS. 14-16, there is illustrated a fourth embodiment of a ball nut assembly, indicated generally at 470, produced in accordance with the present invention and for use with a parking and emergency brake of a vehicle brake assembly having an electric actuator unit for actuating the parking and emergency brake, thereof. Because the ball nut assembly 470 is a variation of the ball nut assembly 170 of FIGS. 4-7, like reference numerals, increased by 300, designate corresponding parts in the drawings and detailed description thereof will be omitted.

The ball nut assembly 470 includes a first insert 444 having a top flange 456 and a bottom flange 458. While a second insert is not illustrated, the second insert is similar to the first insert 444.

As illustrated, the top flange 456 is a vertical extension of the first insert 444. The top flange includes a tab 468 and a U-shaped opening 467 around the tab 468. The tab 468 acts to align the first insert 444 to "external" threads 494A and "internal" threads 486A and/or as a stop to control insertion depth in the first opening 450. As illustrated, the bottom flange 458 has an inwardly angled shape and straight vertical edges 451.

Referring now to FIGS. 17-19, there is illustrated a fifth embodiment of a ball nut assembly, indicated generally at 570, produced in accordance with the present invention and for use with a parking and emergency brake of a vehicle brake assembly having an electric actuator unit for actuating the parking and emergency brake, thereof. Because the ball nut assembly 570 is a variation of the ball nut assembly 170 of FIGS. 4-7, like reference numerals, increased by 400, designate corresponding parts in the drawings and detailed description thereof will be omitted.

The ball nut assembly 570 includes a first insert 544 having a top flange 556 and a bottom flange 558. While a second insert is not illustrated, the second insert is similar to the first insert 544.

As illustrated, the top flange 556 is a vertical extension of the first insert 544. The top flange includes an outwardly extending tab 568 from a top edge 569. The tab 568 acts to align the first insert 544 to "external" threads 594A and the "internal" threads 586A and/or as a stop to control insertion depth in the first opening 550. As illustrated, the bottom flange 558 has an inwardly angled shape and straight vertical edges 551.

Figure 22:
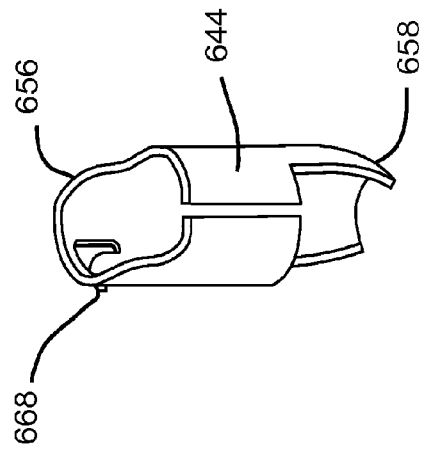
FIG. 22 is a perspective view of an insert used in the sixth embodiment of the ball nut assembly illustrated in FIGS. 20 and 21.
Figure 20:
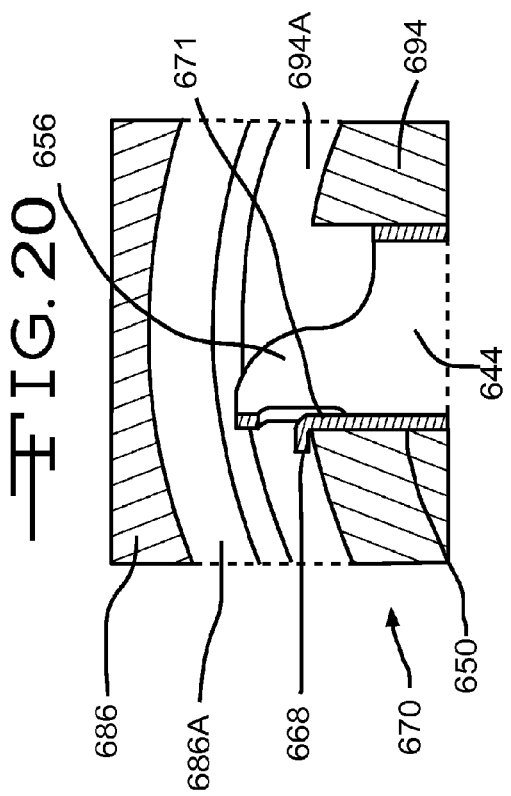
FIG. 20 is a partial sectional view of a sixth embodiment of a ball nut assembly in accordance with the present invention.
Figure 21:
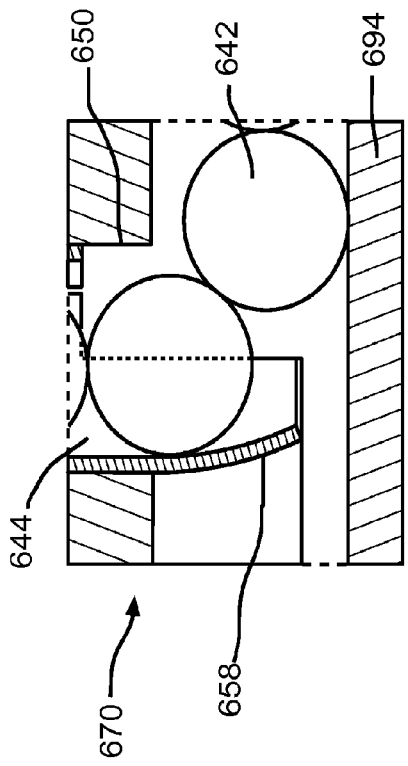
FIG. 21 is a second partial sectional view of the sixth embodiment of the ball nut assembly illustrated in FIG. 20.

Referring now to FIGS. 20-22, there is illustrated a sixth embodiment of a ball nut assembly, indicated generally at 670, produced in accordance with the present invention and for use with a parking and emergency brake of a vehicle brake assembly having an electric actuator unit for actuating the parking and emergency brake, thereof. Because the ball nut assembly 670 is a variation of the ball nut assembly 170 of FIGS. 4-7, like reference numerals, increased by 500, designate corresponding parts in the drawings and detailed description thereof will be omitted.

The ball nut assembly 670 includes a first insert 644 having a top flange 656 and a bottom flange 658. While a second insert is not illustrated, the second insert is similar to the first insert 644.

As illustrated, the top flange 656 is a vertical extension of the first insert 444. The top flange includes an outwardly extending tab 668 from a bottom edge 671. The tab 668 acts to align the first insert 644 to "external" threads 694A and the "internal" threads 686A and/or as a stop to control insertion depth in the first opening 650. As illustrated, the bottom flange 658 has a rounded scoop shape and straight vertical edges 651.

Figure 23:
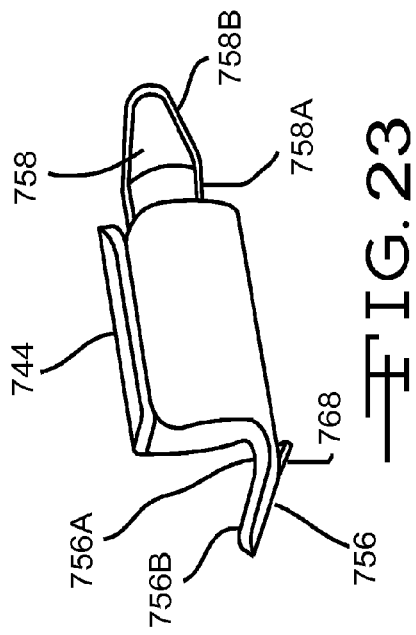
FIG. 23 is a perspective view of inserts for use in a seventh embodiment of a ball nut assembly in accordance with the present invention.

Referring now to FIG. 23, there is illustrated a first insert 744 for use with a seventh embodiment of a ball nut assembly produced in accordance with the present invention and for use with a parking and emergency brake of a vehicle brake assembly having an electric actuator unit for actuating the parking and emergency brake, thereof. Because the seventh embodiment of the ball nut assembly is a variation of the ball nut assembly 170 of FIGS. 4-7, like reference numerals, increased by 600, designate corresponding parts in the drawings and detailed description thereof will be omitted.

The first insert 744 has a top flange 756 and a bottom flange 758. While a second insert is not illustrated, the second insert is similar to the first insert 744.

As illustrated, the top flange 756 comprises a vertical extension portion 756A and an angled portion 756B. The top flange includes an outwardly extending tab 768 that is coplanar with the angled portion 756B. The tab 768 acts to align the first insert 744 to "external" and "internal" threads and/or as a stop to control insertion depth in the first opening 650. Similarly, the bottom flange 758 comprises a vertical extension portion 758A and an angled portion 756B.

Figure 25:
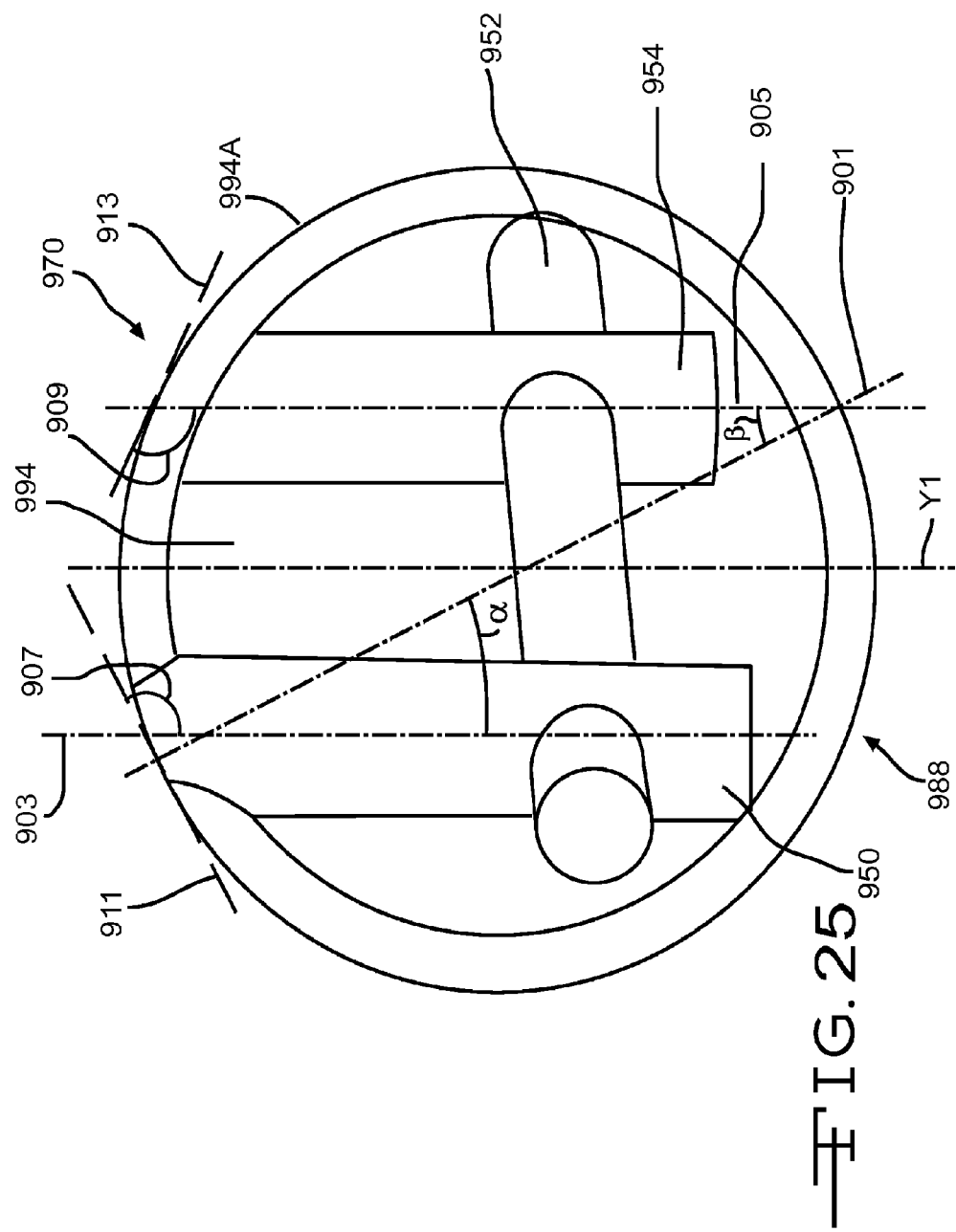
FIG. 25 is a sectional view taken along line 25-25 of FIG. 24.

Referring now to FIGS. 24 and 25, there is illustrated an eighth embodiment of a ball nut assembly, indicated generally at 970, produced in accordance with the present invention and for use with a parking and emergency brake of a vehicle brake assembly having an electric actuator unit for actuating the parking and emergency brake, thereof. Because the ball nut assembly 970 is a variation of the ball nut assembly 170 of FIGS. 4-7, like reference numerals, increased by 800, designate corresponding parts in the drawings and detailed description thereof will be omitted.

A first side opening 950 and a third side opening 954 are laterally offset from a radial axis Y1. As illustrated, the first side opening 950 is on a first offset axis 903 and the second side opening 954 is on a second offset axis 905. The first offset axis 903 is at an angle α to a radial axis 901 and the second offset axis 905 is at an angle β to the radial axis 901. The angle α may be less than, equal to, or greater than the angle β. Because the first opening 950 and the third opening 954 are laterally offset, the second opening 952 is at an angle through a first end section 994 of a ball screw 988—i.e., the second opening 952 is not parallel to a center axis of the ball screw 988.

As illustrated, the first and third openings 950 and 954 are linear. Alternatively, the first and third openings 950 and 954 may be non-linear. For example, the first and third openings 950 and 954 may have a curved path through the first end section 994. As illustrated, the first offset axis 903 and the second offset axis 905 are other than perpendicular to an outer surface of the first end section 994.

Offsetting the first opening 950 creates a first angle 907 between a first tangent line 911 and the first offset axis 903. The first tangent line 911 is tangential to the "external" threads 994A. Offsetting the third opening 954 creates a second angle 909 between a second tangent line 913 and the second offset axis 905. The second tangent line 913 is tangential to the "external" threads 994A at the third side opening 954. As illustrated, the first and second angles 907 and 909, respectively, are greater than ninety degrees. As illustrated, an angle for the bearing members (not shown) to turn around when entering or exiting the first opening 950 or the third opening 954 is reduced by approximately thirty degrees compared to the ball nut assembly 170.

By the first and second angles being greater than ninety degrees, forces acting on bearing members are reduced when the bearing members enter and exit the first and third openings 950 and 954, respectively.

In accordance with the provisions of the patent statutes, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A brake assembly comprising:
   a service brake assembly; and
   an electromechanically actuable parking brake assembly having a ball nut assembly, the ball nut assembly comprising a ball screw and a ball nut that form a raceway therebetween for bearing members, wherein the bearing members circulate within an internal path formed in the ball screw and the parking brake assembly is part of the service brake assembly.

2. The brake assembly of claim 1 wherein the internal path comprises:
   a first opening extending radially inward from the raceway;
   a second opening extending through the ball screw; and
   a third opening extending radially inward from the raceway, wherein the second opening connects the first and third openings.

3. The brake assembly of claim 1 wherein the internal path comprises:
   a first opening on a first offset axis, wherein the first offset axis is at a first angle to a radial axis;

a second opening through the ball screw; and a third opening on a second offset axis, wherein the second offset axis is at a second angle to the radial axis and the second opening connects the first and third openings.

4. The brake assembly of claim 1 wherein the internal path comprises:
   a first opening, wherein the first opening is non-perpendicular to an outer surface of the ball screw;
   a second opening through the ball screw; and
   a third opening, wherein the third opening is non-perpendicular to the outer surface and the second opening connects the first and third openings.

5. The brake assembly of claim 1 wherein at least one of the first or third openings has an insert.

6. The brake assembly of claim 5 wherein the insert has at least one top or bottom flange.

7. The brake assembly of claim 5 wherein the insert has a tab.

8. The brake assembly of claim 5 wherein the insert has a dimple.

9. A ball nut assembly for an electromechanically actuable parking brake assembly, the ball nut assembly comprising:
   a ball nut having an internal thread; and
   a ball screw having an external thread, wherein the internal and external threads form a raceway and the ball screw has first, second, and third openings, wherein the first and third openings are from an outer surface of the ball screw and the second opening is internal to the ball screw and connects the first and third openings.

10. The ball nut assembly of claim 9 wherein the first opening extends radially from the outer surface, the second opening extends axially through the ball screw, and the third opening extends radially from the outer surface.

11. The ball nut assembly of claim 9 wherein the first opening is on a first offset axis, the first offset axis being at a first angle to a radial axis and the third opening is on a second offset axis, the second offset axis being at a second angle to the radial axis.

12. The ball nut assembly of claim 9 wherein the first and third openings are non-perpendicular to the outer surface.

13. The ball nut assembly of claim 9 further comprising:
   bearing members supporting the ball nut on the ball screw, wherein the bearing members circulate through the raceway and first, second, and third openings.

14. The ball nut assembly of claim 9 wherein the first, second, and third openings form a path internal to the ball screw.

15. The ball nut assembly of claim 9 further comprising:
   a first insert for the first opening; and
   a second insert for the third opening.

16. The ball nut assembly of claim 15 wherein the first and second inserts have top and bottom flanges.

17. The ball nut assembly of claim 16 wherein the top flanges of the first and second inserts have tabs.

18. The ball nut assembly of claim 16 wherein the top flanges of the first and second inserts have dimples.

19. A ball nut assembly for an electromechanically actuable parking brake assembly, the ball nut assembly comprising:
   a ball nut having an internal thread;
   a ball screw having an external thread, wherein the internal and external threads form a raceway for bearing members that support the ball nut on the ball screw and the ball screw has a first opening from the raceway, a second opening through the ball screw, and a third opening from the raceway, wherein the second opening connects the first and third openings, the bearing members circulate through the raceway, first opening, second opening, and third opening;
   a first insert in the first opening, the first insert having top and bottom flanges; and
   a second insert for the third opening, the second insert having top and bottom flanges.

20. The ball nut assembly of claim 19 wherein the first and second insert top flanges have tabs.

* * * * *